Oct. 31, 1967 　　　　L. F. FRIED 　　　　3,349,805

WASHING MACHINE DRAIN HOSE

Filed Sept. 23, 1964

INVENTOR.
Louis. F. Fried
BY Robb+Robb
　　attorneys 3,349,805
WASHING MACHINE DRAIN HOSE
Louis F. Fried, Westlake, Ohio., assignor to Joseph Dyson & Sons, Inc., Eastlake, Ohio, a corporation of Ohio
Filed Sept. 23, 1964, Ser. No. 398,727
1 Claim. (Cl. 138—109)

This invention relates to hose construction and particularly to the formation of hose which is used in connection with domestic appliances such as washing machines or the like for draining off drain water or similarly used water or water which is temporarily to be removed from the washing machine for subsequent re-use.

Basically, the drain hose in a washing machine may be of any particular form but in different washing machines different types and sizes of hoses are required, thus necessitating substantial cost in manufacture and inventory therefor where replacement or renewal is one of the problems as is frequently true of this type of hose because of the abuse and use which it receives.

Since various washing machines require hoses of different lengths to be bent in different directions, combined with the variation in size of the connection of the hose to the pump or sump as the case may be, the necessity to supply many different kinds is seen to exist and it is a primary object of this invention to obviate the necessity for manufacture and inventory of seven or eight different hoses of varying formations.

One of the problems also in hoses used in washing machine discharge connection is that when the hose is bent restriction in the area of the interior is often the result, and this is desirably overcome in order to effect discharge quickly since it is done under the pressure of a pump because discharge is usually had to an elevation higher than the drain outlet.

It will be of course appreciated that various manufacturers locate the pump in different positions, use different size discharge lines for the pump and thereby necessitate the provision of many different types of hoses for different types of washing machines as hereinbefore pointed out.

With the foregoing in mind and particularly noting that it is desirable in the replacement market to provide a hose which will suit or can be used with a large number of machines of different manufacturers, the principal object of the invention therefore is to provide such a hose which may be connected to varying sizes of pump outlets, be bent in different directions without restricting the cross sectional area of the interior of the hose, and be formed with a discharge end in the usual reversely bent form or if not that, in any event, to provide for discharge through the hose with a minimum of restriction therein.

Another object of the invention is to provide a drain hose in which a connectible end is provided with means whereby the same may be connected to varying sizes of discharge outlets of pumps, through a rather wide range of size in point of fact, owing to the formation of the said end.

Another object of the invention is to provide a hose in which an angularly adjustable portion is furnished which portion, when caused to bend angularly, does not restrict the flow of water therethrough, by causing the cross sectional diameter to be reduced.

Another object of the invention is to provide a hose in which all the various previously described desirable constructions are combined so that a single hose may be used on varying washing machines and thus reduce the inventory and cost of manufacture thereof.

Other and further objects of the invention will be understood from a consideration of the specification appended hereto and disclosed in the drawing wherein.

Figure 1:
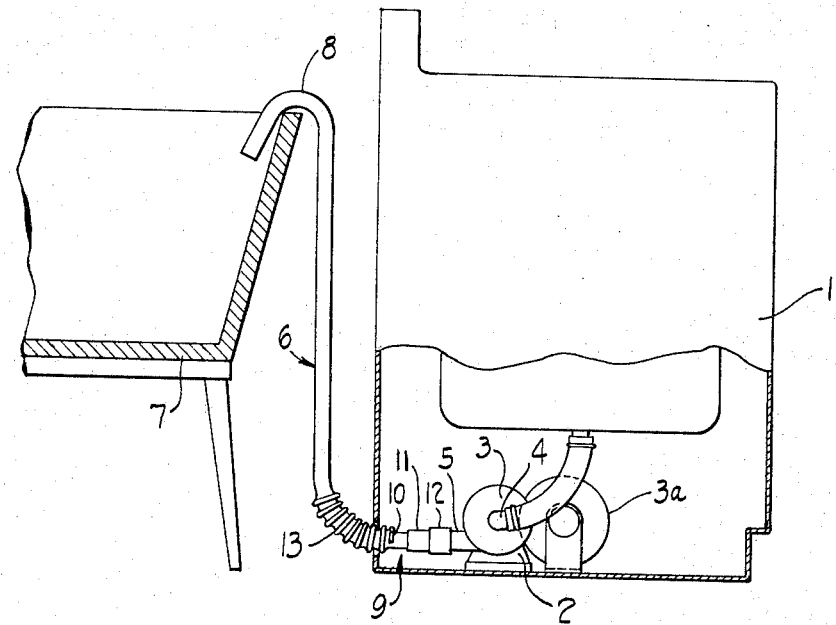
FIGURE 1 is a somewhat fragmentary view illustrative of the use of a hose of this invention.

Referring to FIGURE 1 therefore, a washing machine generally designated 1 is suggested, having a mounting section 2 upon which a pump 3 is supported, the pump 3 being equipped with an inlet opening at 4 and a discharge opening at 5 consisting of a pipe-like member, the pump 3 being driven in the usual manner by a suitable motor shown here as 3a.

The hose of the invention is generally designated at 6, and is shown as being arranged to discharge the water in the machine into a laundry tray such as suggested at 7.

The hose 6 includes at one end a reversely bent hook-like section 8, which hook-like section is molded into the hose at the time of its manufacture so that it retains this shape and thus may be hoofed or otherwise supported over the lip of a laundry tray in the manner generally suggested.

The other end of the hose 6, consists of a universally connectible section generally designated 9, which section comprises a series of connecting portions 10, 11 and 12, likewise molded and thus integral with the body of the hose 6, these portions 10, 11 and 12 having interior diameters such as three-quarters, seven-eighths, and one-inch respectively, the hose being round as will be understood.

The outlet 5 of the pump 3 is shown as being connected to the portion 12, but it is apparent that if the outlet 5 is smaller, the connection 12 may be cut off and the section 11 for example engaged with the pump outlet. It is further to be understood that if the outlet of a pump such as the pump 3, is even smaller than the portion 11, the portions 11 and 12 may be removed as by any suitable instrument and connection effected by the portion 10 to the pump outlet such as 5.

It will thus be observed that several different sizes of pumps may be accommodated and the number of portions such as 10, 11 and 12 increased within limits if found desirable as a result of greater variation in pump outlet discharge sections.

Figure 2:
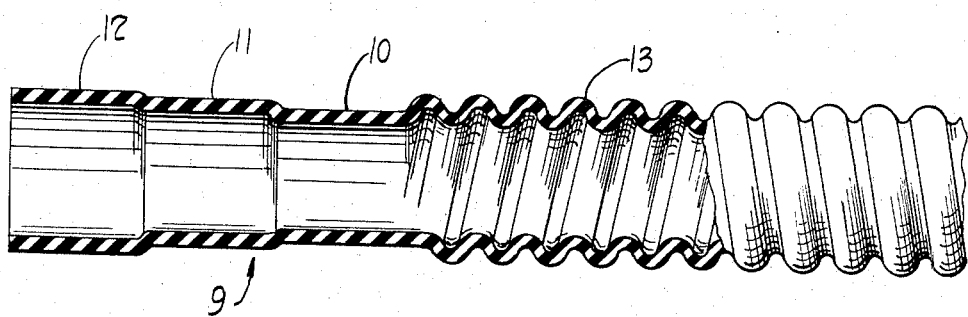
FIGURE 2 is an enlarged fragmentary cross sectional view showing the formation of certain of the important elements hereof.

Intermediate the ends 8 and 9, the body of the hose may extend for five or six feet for example, and be equipped as shown with an angularly adjustable portion 13, which is more particularly disclosed in FIGURE 2, as consisting of a spiral accordion-like formatiton, molded at the time of manufacture of the hose itself, the fact that it is spiral being important in this overall consideration because the bend may be made at any given desired radius and yet no restriction of the cross sectional area of the hose is noticeable or substantially effected. This spiral formation is in contrast to a type of formation in which the convolutions would be a series of ring-like convolutions rather than that disclosed, the ring-like convolutions being somewhat better than the ordinary bend in a hose but still not as free from restricting action as the spirally wound or spiral accordion-like formation herein disclosed.

In view of the foregoing, it will be noted that there is thus provided a drain hose or a hose for similar purposes, which is nearly universally usable for various washing machines for example and accommodates different connecting requirements and facilitates bending of the hose without restriction, at the same time including the hook-like formation for purposes hereof.

I claim:

In a universal pump connected discharge conduit for conducting discharged fluid from a washing machine pump to a drain facility, the combination comprising: a substantially tubular conduit including a relatively rigid hooked end portion, a tubular body portion terminating in a plurality of selectively engageable female connector portions, each of different diameter, and each provided with a substantially cylindrical barrel portion terminating in an interiorly disposed abutment member defining a step to differentiate the next successive connector barrel and further defining a stop means engageable with the extremity of the male portion of a pump discharge outlet, said female connector portions being selectively employed to accommodate male pump discharge outlets of complementary diameter, said plurality of female connector portions each increasing in diameter over its predecessor progressively toward the extremity of said discharge conduit opposite said hooked end portion, and a flexible portion intermediate said hooked portion and said discharge connector portions including a molded spirally configured section adapted to pass through the cabinet of said washing machine and to be angularly deformed at that point to direct the flow of discharged fluid in a sharply divergent direction without impeding the flow of said fluid by constriction of said conduit.

References Cited

UNITED STATES PATENTS

| | | | |
|---|---|---|---|
| 2,141,916 | 12/1938 | Johnson | 68—208 X |
| 2,449,754 | 9/1948 | Seitz | 285—4 |
| 3,060,069 | 10/1962 | Sindars | 138—122 X |

FOREIGN PATENTS

| | | |
|---|---|---|
| 765,786 | 6/1934 | France. |
| 893,194 | 6/1944 | France. |
| 1,307,295 | 9/1962 | France. |
| 567,486 | 10/1957 | Italy. |

LAVERNE D. GEIGER, *Primary Examiner.*

C. L. HOUCK, *Assistant Examiner.*